US009220014B2

United States Patent
Ore et al.

(10) Patent No.: US 9,220,014 B2
(45) Date of Patent: *Dec. 22, 2015

(54) ACCESS CONTROL FOR CLOSED SUBSCRIBER GROUPS

(71) Applicant: CELLULAR COMMUNICATIONS EQUIPMENT LLC, Plano, TX (US)

(72) Inventors: Ivan Ore, Nummela (FI); Markus Dillinger, Oberhaching (DE)

(73) Assignee: Cellular Communications Equipment LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,124

(22) Filed: Jul. 7, 2014

(65) Prior Publication Data

US 2014/0325597 A1 Oct. 30, 2014

Related U.S. Application Data

(63) Continuation of application No. 12/283,240, filed on Sep. 10, 2008, now Pat. No. 8,774,801.

(60) Provisional application No. 60/993,291, filed on Sep. 10, 2007.

(51) Int. Cl.
*H04W 36/00* (2009.01)
*H04W 12/08* (2009.01)
(Continued)

(52) U.S. Cl.
CPC .............. *H04W 12/08* (2013.01); *H04W 60/00* (2013.01); *H04W 4/08* (2013.01); *H04W 48/08* (2013.01); *H04W 76/02* (2013.01)

(58) Field of Classification Search
CPC ....... H04W 4/08; H04W 48/08; H04W 12/08; H04W 76/02; H04W 60/00

USPC ................................ 455/435.1, 411; 370/329
See application file for complete search history.

(56) References Cited

U.S. PATENT DOCUMENTS

| 5,512,885 A | 4/1996 | Agestam et al. |
| 6,097,949 A | 8/2000 | Jung et al. |

(Continued)

FOREIGN PATENT DOCUMENTS

| CN | 1726733 A | 1/2006 |
| CN | 101340701 | 1/2009 |

(Continued)

OTHER PUBLICATIONS

3GPP TS 23.401 V1.1.0, 3rd Generation Partnership Project; Technical Specification Group Services and System Aspects; GPRS enhancements for E-UTRAN access (Release 8), Jul. 2007, 79 pgs.

(Continued)

*Primary Examiner* — Charles Shedrick
(74) *Attorney, Agent, or Firm* — Martin & Ferraro, LLP

(57) ABSTRACT

A user equipment receives from a network a transmitted (broadcast) access mode indicator that indicates whether a close subscriber group CSG network is being operated as open or close, and if it indicates open a user equipment UE that is not a registered member of the CSG is allowed access to the close subscriber group network as a guest member. The CSG network can provide higher priority services to its registered members by differentiating them over guest members by an indication, received from each UE in its RADIO RESOURCE CONTROL CONNECTION REQUEST message, whether it is registered or a guest. The CSG can also transmit its ID/name for display at the UE so the UE may select whether and which CSG to join.

19 Claims, 4 Drawing Sheets

(51) Int. Cl.
*H04W 60/00* (2009.01)
*H04W 4/08* (2009.01)
*H04W 48/08* (2009.01)
*H04W 76/02* (2009.01)

(56) References Cited

U.S. PATENT DOCUMENTS

| | | | |
|---|---|---|---|
| 6,463,473 | B1 | 10/2002 | Gubbi |
| 6,628,937 | B1 | 9/2003 | Salin |
| 6,662,005 | B1 | 12/2003 | Palvianen |
| 7,197,034 | B2 | 3/2007 | Muhonen |
| 8,520,068 | B2 | 8/2013 | Naidoo et al. |
| 8,774,801 | B2 | 7/2014 | Ore et al. |
| 2002/0022483 | A1 | 2/2002 | Thompson et al. |
| 2004/0157600 | A1 | 8/2004 | Stumpert et al. |
| 2005/0044138 | A1 | 2/2005 | Albert et al. |
| 2005/0070276 | A1 | 3/2005 | McGarry |
| 2005/0198319 | A1 | 9/2005 | Chan et al. |
| 2005/0239445 | A1 | 10/2005 | Karaoguz et al. |
| 2006/0171537 | A1 | 8/2006 | Enright |
| 2007/0183427 | A1 | 8/2007 | Nylander et al. |
| 2008/0076412 | A1 | 3/2008 | Khetawat et al. |
| 2008/0132239 | A1 | 6/2008 | Khetawat et al. |
| 2008/0267153 | A1* | 10/2008 | Mukherjee et al. ........... 370/338 |
| 2009/0042593 | A1 | 2/2009 | Yavuz et al. |
| 2009/0042596 | A1 | 2/2009 | Yavuz et al. |
| 2009/0047931 | A1* | 2/2009 | Nanda et al. ................. 455/411 |

FOREIGN PATENT DOCUMENTS

| | | |
|---|---|---|
| EP | 1 032 236 A1 | 8/2000 |
| EP | 1 212 916 B1 | 6/2002 |
| EP | 1 786 195 A1 | 5/2007 |
| EP | 2 082 554 B1 | 3/2012 |
| EP | 2 611 252 A1 | 7/2013 |
| RU | 2005/134506 | 6/2006 |
| WO | WO 00/54537 | 9/2000 |
| WO | WO 01/93609 | 12/2001 |
| WO | WO 02/17671 A | 2/2002 |
| WO | WO 02/19222 | 3/2002 |
| WO | WO 03/075516 | 9/2003 |
| WO | WO 2004/056149 | 7/2004 |
| WO | WO 2005/051030 A1 | 6/2005 |
| WO | WO 2007/040449 | 4/2007 |
| WO | WO 2007/139460 | 12/2007 |

OTHER PUBLICATIONS

3GPP TS 36.300 V.8.1.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), pp. 101-103, Jun. 2007, 4 pgs.

3GPP TS 36.300 V8.1.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), pp. 100-103, Jun. 2007, 4 pgs.

NTT DoCoMo, T-Mobile, "Clarification of Home eNB scenarios and issues for RAN2/3/4," 3GPP TSG RAN WG2 #60, Jeju, Korea, Tdoc-R2-075151, Nov. 2007, 3 pgs.

NTT DoCoMO, T-Mobile, "CSG with Limited Open Access," 3GPP TSG RAN WG2 #60, Jeju, Korea, Tdoc-R2-075150, Nov. 5-9, 2007, 2 pgs.

3GPP TSG RAN WG2 #60, Jeju, Korea, NTT DoCoMo, T-Mobile, "Clarification of Home eNB scenarios and issues or RAN2/3/4" (Nov. 2007).

3GPP TSG RAN WG2 #60, Jeju, Korea, NIT DoCoMo, T-Mobile, "CSG with Limited Open Access" (Nov. 2007).

3GPP TS 36.300 V.8.1;0 (Jun. 2007) 3'd Generation Partnership Project; Technical Specification Group Radio Access Network; Evolved Universal Terrestrial Radion Access (E-UTRA) and Evolved Universal Terrestrial Radio Access Network (E-Utran); Stage 2 (Releases), (pp. 101-103).

3rd Generation Partnership Project; Technical Specification Group Services and System Aspects; GPRS enhancements for E-UTRAN access, (Release 8) 3GPP TS 23.401 VI .1.0 (Jul. 2007).

3rd Generation Partnership Project; Technical Specification Group Radio Access Network; Evolved Universal Terrestrial Radio Access (E-UTRA) and Evolved Universal Terrestrial Radio Access Network (E_UTRAN): Overall description: Stage 2 (Release 8), 3 GPP TS 36.300 VS.LO (Jun. 2007), pp. 100-103.

Dordevic, "Architecture for Dynamic and Secure Group Working," submitted for the degree of doctor of philosophy, Department of Electronic Engineering, Queen Mary, University of London, UK, Jun. 2004, 193 pgs.

Finland Patent Application 20075252 filed on Apr. 13, 2007.

Katzela et al., "Channel Assignment Schemes for Cellular Mobile Telecommunication Systems: A Comprehensive Survey," IEEE Personal Communications, pp. 10-31, Jun. 1996, 22 pgs.

LAN MAN Standards Committee of the IEEE Computer Society, "Part 11: Wireless LAN Medium Access Control (MAC) and Physical Layer (PHY) specifications," IEEE Std 802.11-1997, Jun. 26, 1997, 459 pgs.

Nokia Siemens Networks, "DRAFT LS on CSG Cells Handling," 3GPP TSG-RAN WG2 Meeting #59, R2-073634, Aug. 20, 2007, 1 pg.

Vodafone Group, "Camping on and accessing to CSG cells in LTE_IDLE," 3GPP TSG RAN WG2#58bis, R2-072828, Jun. 25, 2007, 2 pgs.

Vodafone Group, "CSG Subscription management," 3GPP TSG RAN WG2#58bis, R2-072824, Jun. 25, 2007, 2 pgs.

Vodafone Group, "Signalling on a CSG Cell," 3GPP TSG RAN WG2#58bis, R2-072831, Jun. 25, 2007, 2 pgs.

Vodafone, Telecom Italia, "CR to 24.801 to Introduce Closed Subscriber Groups," 3GPP TSG CT WG1 Meeting #48, C1-072168, Aug. 20, 2007, 3 pgs.

www.fon.com/en (visited Sep. 5, 2007).

* cited by examiner

ACCESS CONTROL FOR CLOSED SUBSCRIBER GROUPS

CROSS REFERENCE TO RELATED APPLICATION

This application is a Continuation of U.S. patent application Ser. No. 12/283,240, filed Sep. 10, 2008, which claims priority under 35 U.S.C. 119(e) to U.S. Provisional Patent Application No. 60/993,291, filed Sep. 10, 2007, of which the contents including Appendices are incorporated herein in its entirety.

TECHNICAL FIELD

The teachings herein relate generally to wireless networks that employ access restrictions for certain parts of the network, such as networks having cells such as the closed subscriber groups of 3GPP TS.36.300 that are open only to members of a pre-designated group.

BACKGROUND

The following abbreviations and terms are herewith defined:
3GPP third generation partnership project
E-UTRAN evolved UTRAN
GERAN global system for mobile communication (GSM) enhanced data rate radio access network
IMSI/IMEI international mobile subscriber/equipment identity
LTE long term evolution of 3GPP (also E-UTRAN or 3.9G)
Node B base station, e.g., an evolved (e-)Node B of an LTE system
UE user equipment (e.g., mobile equipment/station
UMTS universal mobile telecommunications system
UTRAN UMTS terrestrial radio access network 3GPP is standardizing the long-term evolution (LTE) of the radio-access technology which aims to achieve reduced latency, higher user data rates, improved system capacity and coverage, and reduced cost for the operator, One particular aspect of LTE relevant to these teachings is termed therein a closed subscriber group CSG. Annex F of 3GPP TS 36.300 (V8.1.0, 2007-06; Overall Description; Stage 2), describes a concept of Home e-node Bs that form one or more CSG cells (attached as Appendix A of the priority document). Access is restricted in these CSG cells due to quality of service QoS requirements and regulatory issues in sharing the backhaul link at that location.

One prior art disclosure relevant to the environment in which these teachings are appropriate is Finland patent application no. 20075252, filed on Apr. 13, 2007 and entitled "Method, radio system, mobile terminal and base station" (attached as Appendix B to the priority document). There is described the concept of 'local breakout services,' in which a user equipment detects availability of a local breakout service to an internet protocol gateway, starts network entry, and configures its protocol stack on the basis of configuration data received from the local breakout service. This local breakout service may be considered in some respects analogous to the home e-node B and the CSG cells described in 3GPP TS 36,300 noted above.

The registered owner' of the home e-node B adds subscribers to its user group, and it is the members of the user group that are allowed access to the CSG cell. Because one or more home e-node Ss can be linked to form more than one CSG cell contiguous with one another, it is convenient to term them a CSG network. A CSG network is a network composed of one or more cells with access permissions managed at feast partially by final consumers. Those subscribers registered as members of the user group are CSG members. A CSG member is a wireless service (cellular) user registered to the CSG network by the CSG administrator, and once registered is allowed to access the CSG network. Those users or devices not registered to the CSG are not allowed access to it, hence the term closed subscriber group. In CSG networks, only the devices (user equipment or UEs) that have been granted permission to access a CSG network may camp or connect to that network. Examples of CSG cells include a home e-node B (LTE cells that are purchased by the consumer) or corporate cells (cells that are hired or owned by a company) and "commercial" cells (cells that are owned by retailing companies, supermarkets etc). It is the responsibility of the CSG administrator to register a user as CSG member.

While the CSC network can control and modify the subscribers that form its user group quickly, access is restricted to registered subscribers and closed to other users. The procedure in which a user is added as a CSG member of a CSG network is generally as follows. The CSG administrator adds the IMSI/IMEI or phone number to the operator's database; the operator sends a list of one or more CSG network identifiers to the user via NAS signaling; and once user receives the NAS information, the user becomes a CSG member and therefore is allowed to access all the cells that belong to the same CSG network identifier.

Mobility of the user group members between the CSG network and other cells that are 'open' (non-CSG cells, whether they be E-UTRAN, UTRAN, GERAN, or others) is described also at Annex F of 3GPP TS 36.300 referenced above so that user group members prioritize their CSG network over other cells when within range of the CSG network. In this manner the CSG concept expands overall coverage of the public, non-closed network, though only to the user group members.

The concept of the CSG networks may be considered useful in the context of a corporate or university campus, or a retail establishment. The corporation or university allows its employees/students free or low cost access to the CSG by enrolling them into the appropriate user group white restricting others from free riding on the service. Adding members to these groups on an ad hoc basis, such as visiting speakers or professors, is not a difficult matter as these additions will generally be only occasional.

Businesses on the other hand may want to provide their customers with free car tow cost access in order to lure them and encourage them to linger longer and possibly purchase more of the business' regular products or services. For example a restaurant or café may prefer to provide a free or low-cost Internet access to its customers in order that they choose that establishment over competitors and stay longer once there. Vodafone® has indicated a desire to allow public users access to restricted networks. But in these instances the 'public' users' we constitute the vast majority of users on the closed network, and each would have to be registered individually as above into the user group to enable their access to the CSG network. It is quite impractical and perhaps not even possible under current understanding of CSGs for a café or restaurant to add such a potentially large number of users' IMSIs (or phone numbers) to its user group database to enable them access to its CSG network.

What is needed in the art is a way to enable public, non-members of a CSG user group access to the operator's CSG network. No prior art solution is known; the only option of which the inventors are aware is to register the potential user into the user group and allow access as normal.

SUMMARY

In accordance with one particular embodiment of the invention is a method that includes transmitting an access mode indicator that indicates whether a closed subscriber/group network is being operated as open or closed; and for the case that the access mode indicator indicates that the closed subscriber group network is being operated as open, establishing a bidirectional link with a user equipment that is not a registered member of a user group of the closed subscriber group network and allowing the user equipment access to the closed subscriber group network as a guest member.

In accordance with another embodiment of the invention is a computer readable memory embodying a program of instructions that when executed by a processor cause actions directed to selectively operating a closed subscriber group network as open of closed. In this embodiment the actions include transmitting an access mode indicator that indicates whether a closed subscriber group network is being operated as open or closed; and for the case that the access mode indicator indicates that the closed subscriber group network is being operated as open, establishing a bidirectional link with a user equipment that is not a registered member of a user group of the closed subscriber group network and allowing the user equipment access to the closed subscriber group network as a guest member.

In accordance with yet another embodiment of the invention is an apparatus that includes a transmitter, a processor and a receiver. The transmitter is configured to send an access mode indicator that indicates whether a closed subscriber group network is being operated as open or closed. The processor is configured, for the case that the access mode indicator indicates that the closed subscriber group network is being operated as open, to operate the transmitter and the receiver so as to establish a bidirectional link with a user equipment that is not a registered member of a user group of the closed subscriber group network and thereby allow the user equipment access to the closed subscriber group network as a guest member.

In accordance with still another embodiment of the invention is a method that includes receiving at an apparatus from a closed subscriber group network an access mode indicator that indicates whether a closed subscriber group network is being operated as open or closed; and for the case that the access mode indicator indicates that the closed subscriber group network is being operated as open and that the apparatus is not previously a registered member of a user group of the closed subscriber group network, establishing a bidirectional link between the apparatus and the closed subscriber group network and the apparatus accessing the closed subscriber group network as a guest member.

In accordance with a further embodiment of the invention is a computer readable memory embodying a program of instructions that when executed by a processor cause actions directed to accessing a closed subscriber group network as a guest member. In this embodiment the actions include receiving at an apparatus from a closed subscriber group network an access mode indicator that indicates whether a closed subscriber group network is being operated as open or closed; and for the case that the access mode indicator indicates that the closed subscriber group network is being operated as open and that the apparatus is not previously a registered member of a user group of the closed subscriber group network, establishing a bidirectional link between the apparatus and the closed subscriber group network and thereby access the closed subscriber group network as a guest member.

In accordance with a still further embodiment of the invention is an apparatus that includes a receiver, a processor and a transmitter. The receiver is configured to receive at an apparatus from a closed subscriber group network an access mode indicator that indicates whether a closed subscriber group network is being operated as open or closed. The processor is configured, for the case that the access mode indicator indicates that the closed subscriber group network is being operated as open and that the apparatus is not previously a registered member of a user group of the closed subscriber group network, to operate the receiver and the transmitter to establish a bidirectional link between the apparatus and the closed subscriber group network and thereby access the closed subscriber group network as a guest member.

In accordance with yet another embodiment of the invention is a method comprising a closed subscriber group network storing content on a platform of a non-restricted network; and the closed subscriber group network configuring messaging options and sending, from the closed subscriber group network via a core network that is a public network, messages that include at least some of the content to users of the closed subscriber group that are in a cell according to the messaging options.

In accordance with a further embodiment of the invention is an apparatus that includes memory and a transmitter. The memory stores content and messaging options of a closed subscriber group network. The transmitter is configured to send, from the closed subscriber group network via a core network that is a public network, at least some of the content to users of the closed subscriber group that are in a cell according to the messaging options.

These and other aspects are detailed below with more particularity.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

Embodiments of this invention relate to closed subscription network such as for example CSGs in E-UTRAN. As noted above, what is needed is a way to allow non-members access to the closed subscription network, and to this end is introduced the concept of a guest member. A guest member as used herein is a wireless (cellular) user that is not registered as a member of a closed subscriber network but are able to access that network all the same given their guest member status if the network administrator grants permission. In certain embodiments, access by guest members is limited to a short period of time. The distinction between a (regular) member of the user group and a guest member is that a user group member is added explicitly by the network administrator (or other controlling entity), such as by registering the IMSI/MEI noted above. To the contrary, guest members are not added to the operator's database but allowed entry when the network administrator sets the closed subscription network for 'open access' as detailed in the embodiments below.

Figure 1:
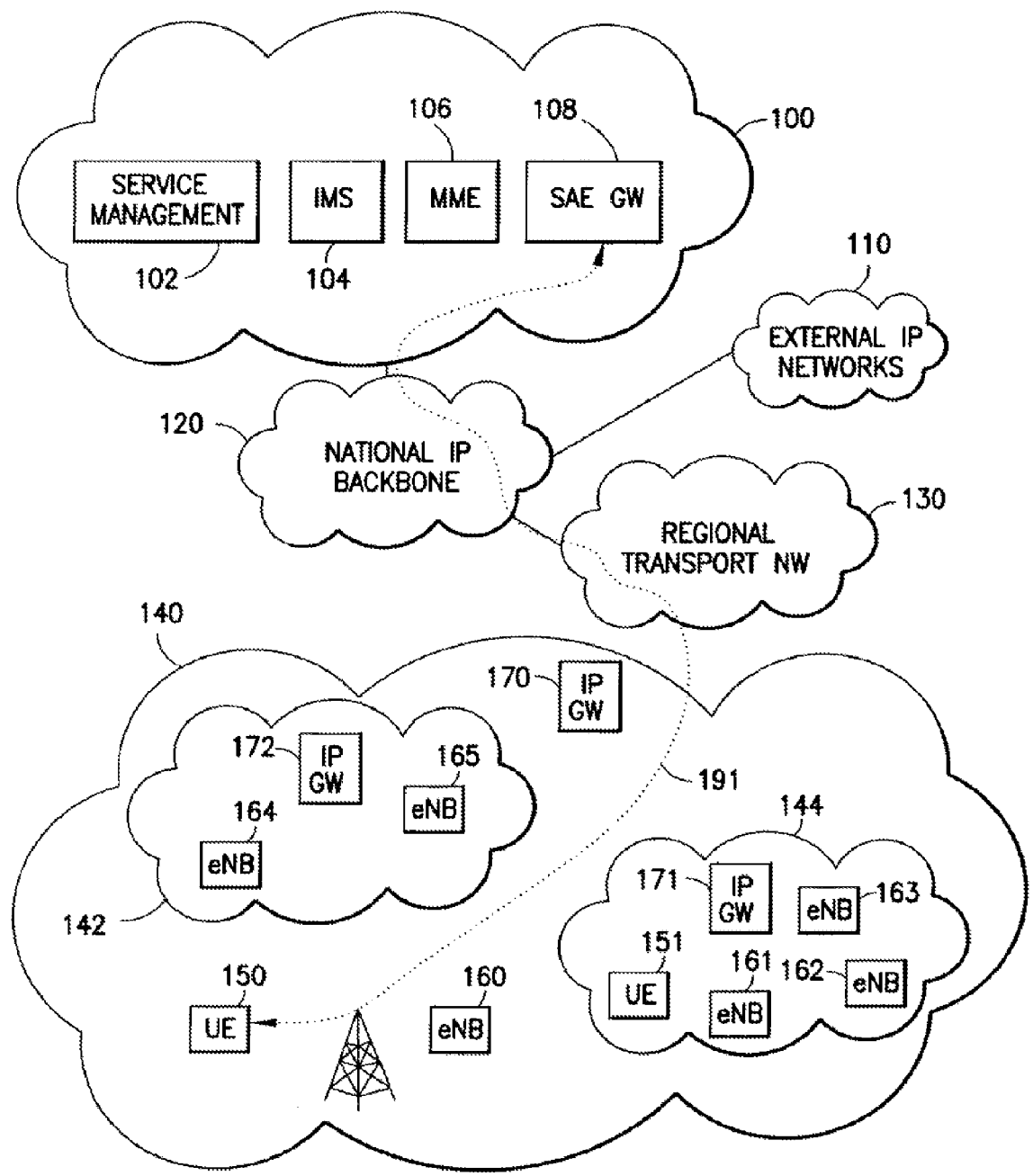
FIG. 1 is an example of an E-UTRAN/LTE radio system environment in which embodiments of the invention may be practiced to advantage.

Reference is now made to FIG. 1 for illustrating an exemplary environment for practicing embodiments of this invention. In this example, the radio system is based on LTE/SAE (Long Term Evolution/System Architecture Evolution) network elements. However, the invention described in these examples is not limited to the LTE/SAE radio systems but can also be implemented in other radio systems, such as HSDPA (high speed downlink packet access), HSUPA (high speed uplink packet access), WIMAX (Worldwide Interoperability for Microwave Access), Internet HSPA, or in other suitable radio systems where there is closed access to certain groups. In addition, the invention can be applied to architectures without local breakout (e.g., current SAE architecture as described in 3GPP TS 23A01, V1.1.0, "3rd Generation Partnership Project; Technical Specification Group Services and System Aspects; GPRS enhancements for E-UTRAN access," July 2007) or with local breakout.

The exemplary radio system of FIG. 1 comprises a service core 100 of operator including the following elements: a service management 102, IMS (IP multimedia subsystem) 104, an MME (Mobility Management Entity) 106, and an SAE GW (SAE Gateway) 108.

Traffic between mobile terminals 150, 151 (generally termed user equipment or UEs) and the service core network 100 is carded via a national IP backbone network 120, a regional transport network 130, and a local area aggregation network 140, e-Node Bs (evolved Node Bs) 160 to 165 of the radio system host the functions for radio resource management: radio bearer control, radio admission control, connection mobility control, and dynamic resource allocation (scheduling). In further exemplary radio systems, any LTE radio access node may be used in place of or in conjunction with the eNode Bs. As non-limiting examples, such LTE radio access nodes may include LTE, femto CPE (e.g., Femto Customer Premises Equipment) and/or LTE pico cells. The MME 106 is responsible for distributing paging messages to the e-Node Bs 160 to 165.

Current radio networks are based on a single switch model. This is implemented in the LTE/SAE network by the SAE GW (SAE Gateway) 108. All calls/services are routed via the SAE GW 108. For example, a connection from a mobile terminal 150 to an external IP networks 110, such as to the Internet 110, is typically guided via a route indicated with a dashed line 191. Variations to this are shown in Finland patent application no. 20075252 (referenced above as Appendix B of the priority document) where connecting to an ordinary IP Gateway 170 to 172 (Access Router) in a corporate network 144 or a specific local area 142 for a local IP breakout from a LTE base station 160 to 165 is described while retaining user access control and SAE GW 108 in the LTE/SAE operator's packet core network 100 (this may apply to the exemplary architecture variations described herein as well). That Finland patent application assumes that the registration to the default SAE Bearer services using an IP address from the SAE GW 108 is available, even if not necessarily used for active sessions. That Finland patent application is directed toward optimizing data routing. Embodiments of this invention are directed toward enabling access to the closed network, such as the corporate network 144. In an alternative environment, a gateway of the corporate network 144 links that network 144 to the Internet 110 and also, through a regional access network, to the service core network 100.

A mobile terminal 150, 151 is configured to detect availability of a closed subscriber network 144 for which it is not a member of the corresponding user group; and to start a network entry o the closed subscriber network if that network is set to 'open access'.

Figure 2:
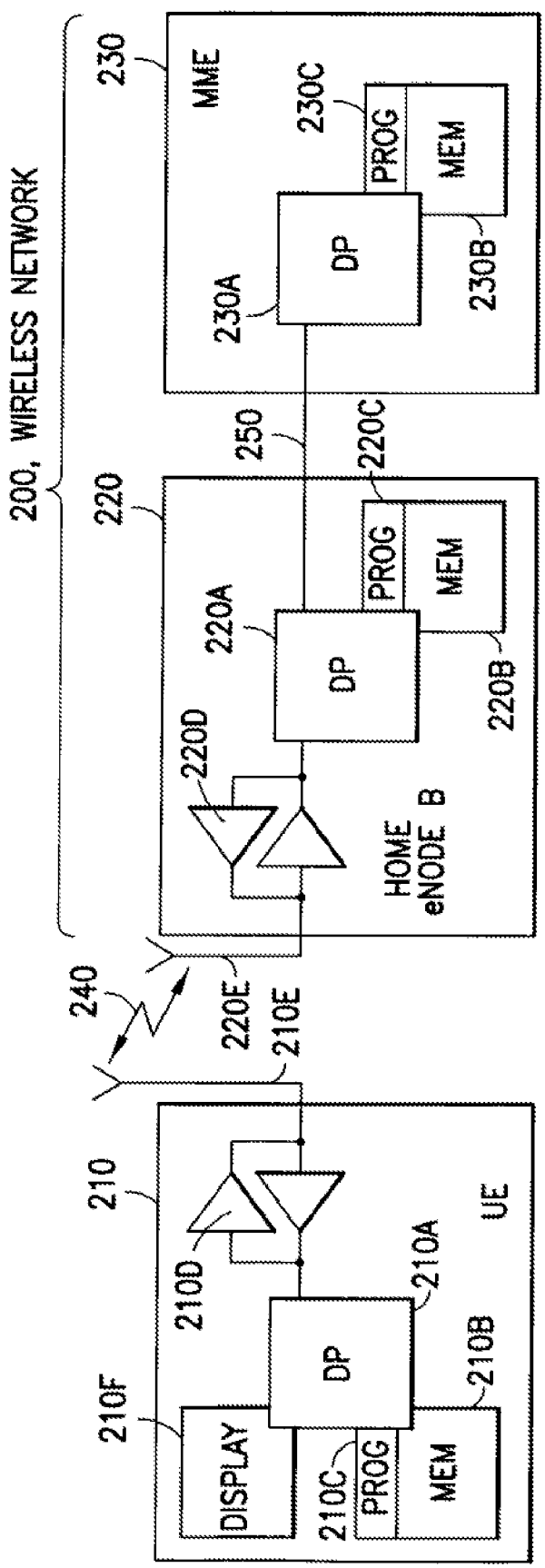
FIG. 2 shows a simplified block diagram of various electronic devices that are suitable for use in practicing the exemplary embodiments of this invention.

FIG. 2 illustrates simplified block diagrams of various electronic devices that are suitable for use in practicing the exemplary embodiments of this invention. In FIG. 2 a wireless network 200 is adapted for communication between a UE/mobile terminal 210 and a home Node B 220. The network 200 may include a higher network node 230 such as the serving mobile mobility entity/element MME 106, the SAE GW 108, a radio network controller RNC or other radio controller function known by various terms in different wireless communication systems. The UE 210 includes a data processor (DP) 210A, a memory (MEM) 210B that stores a program (PROG) 210C, and a suitable radio frequency (RF) transceiver 210D coupled to one or more antennas 210E (one shown) for bidirectional wireless communications over one or more wireless links 240 with the home Node B 220. The UE 210 further includes a graphical display interface 210F such as a computer screen for displaying information to a user of the device 210 as will be detailed below.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non limiting examples.

The e-Node B 220 also includes a DP 220A, a MEM 220B, that stores a PROG 220C, and a suitable RF transceiver 220D coupled to one or more antennas 220E. The Node B 220 may be coupled via a data path 250 (e.g., Iub or S1 interface) to the serving or other GW/MME/RNC 230. The GW/MME/RNC 230 includes a DP 230A, a MEM 230B that stores a PROG 230C, and a suitable modem and/or transceiver (not shown) for communication with the home Node B 230 over the Iub link 250.

At least one of the PROGs 210C, 220C and 230C is assumed to include program instructions that, when executed by the associated DP, enable the electronic device to operate in accordance with the exemplary embodiments of this invention, as detailed above. Inherent in the DPs 210A, 220A, and 230A is a clock to enable synchronism among the various apparatus for transmissions and receptions within the appropriate time intervals and slots required, as the scheduling grants and the granted resources/subframes are time dependent.

The PROGs 210C, 220C, 230C may be embodied in software, firmware and/or hardware, as is appropriate. In general, the exemplary embodiments of this invention may be implemented by computer software stored in the MEM 210B and executable by the DP 210A of the UE 210 and similar for the other MEM 220B and DP 220A of the e-Node B 12, or by hardware, or by a combination of software and/or firmware and hardware in any of the devices shown.

In general, the various embodiments of the UE 210 can include, but is not limited to, mobile stations/mobile terminals, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 210B, 220B and 230B may be of any type suitable to the local technical environment and may be implemented using any suitable data storage technology, such as semiconductor-based memory devices, magnetic memory devices and systems, optical memory devices and systems, fixed memory and removable memory. The DPs 210A, 220A and 230A may be of any type suitable to the local technical environment, and may include one or more of general purpose computers, special purpose computers, microprocessors, digital signal processors (DSPs) and processors based on a multi-core processor architecture, as non-limiting examples.

As summarized above, embodiments of this invention are directed to allowing access to a closed subscriber network for individuals/apparatus/devices that are not registered in that closed network's user group. Without loss of generality, the closed subscriber network is termed hereinafter a CSG network as in LTE, though the embodiments are not limited to only LTE as noted above. According to an embodiment, the CSG has (at least) two access modes: closed and open, in the closed mode, only CSG members (those registered in the user group) can access the cell/network. In the open mode, guest members are allowed access. This is implemented by an access mode indicator, which indicates open or closed status. In an embodiment, the access mode indicator is broadcast by each CSG cell via system information. In LTE, the access mode indicator may be broadcast on the primary broadcast channel P-BCH, the secondary broadcast channel S-BCH or the primary synchronization channel P-SCH. By this information the UE knows whether of not it can camp on that network/cell or not for cell reselection procedures. Having only two states, the access mode indicator may be a single bit (e.g., "1" indicates 'open' and "0" indicates 'closed', or vice versa). The CSG administrator (responsible for the management of the CSG network) may decide the status of the access mode either under the operator's supervision or without such supervision. Under the operator's supervision, the CSG administrator's configuration updates are sent to the operator's core network and the activation of the access mode is made by the operator. Without the operator's supervision, the CSG administrator is able to change the open/access mode of the CSG network directly in the eNode Bs (CSG cells).

According to another (second) aspect of the invention, there is a mobility mechanism where guest members are allowed to enter a CSG network voluntarily. According to this aspect, conventional cell reselection procedures do not handover the guest member/UE to the CSG cell, but instead it is up to the (potential) guest member/UE to decide whether to join the CSG network or not. In practice, such a potential guest member choosing to enter the CSG cell would force (generally manually) the UE device to search and select a CSG network that is configured as open access, which can be known from the broadcast access mode indicator as above. In addition, guest members abandoning the CSG network is also done manually. However mobility of a guest member within the CSG network is done by following similar mobility procedures that apply to the regular CSG members who are in the subscriber user group.

There is a concern that potential guest members, not knowing configuration parameters for the possible CSG networks in the areas in which they are traveling, may have difficulty in searching for the right CSG network to enter, since there are many frequency carrier options that the UE would need to search. According to a third aspect of the invention is a collection of CSG network configuration data that CSG owners may provide to the users that will help the UE to search for that particular CSG network. For example, information provided by the CSG administrator can be input manually by the user into the UE before proceeding with the search procedure. This information may range in granularity of the search the potential guest member would conduct, for example a selected wireless technology (e.g., LTE, UTRAN etc), one or more frequency carriers, and also specific CSG network identifiers.

According to a fourth aspect of the invention, there is a mechanism by which the guest member is aware on which CSG network with open access he/she is connected. Since there may be different CSG networks configured as open access in the same area it is important that the guest member connects to the right CSG network. Thus each CSG network should provide to the guest member its network name or identifier. This name or identifier may then be displayed on the UE's screen 201F or PC screen (e.g., for LTE datacards). Two examples are given for implementing this aspect of the invention. In a first option, the network name or identifier is broadcast in system information SI, such as over the P-BCH or S-BCH. In a second option, the network name or identifier is provided by the core network 100 during UE signaling to the core network 100 (e.g., during tracking area update signaling).

According to a fifth aspect of the invention, the guest members memorize (store in their local memory 210B) the CSG network identifier of the CSG network that it is connected to in order to move smoothly between all calls under the same CSG network or part of it. For example with reference to FIG. 1, a mobile terminal 151 within the corporate network 144 would store the identifier for that corporate CSG network and thereby move smoothly between any of the home e-Node Bs 161, 162, 163 of that CSG network 144. In two examples, the network identifier can be read by the guest member UE 210 from the P-BCH or S-BCH if the home node B 220 broadcasts it, or the identifier can be provided directly to the guest member UE 210 via non-access stratum signaling.

According to a sixth aspect of the invention, there are provided priority mechanisms to apply to the CSG regular members, guest members and even to the CSG administrator. This priority mechanism enables the differently prioritized users/UEs to receive different treatment from the CSG network 144. For example, in case of load congestion, all CSG quest members may be dropped from the CSG network in order to retain QoS for the regular members who remain connected in the CSG network. This may be implemented for example by the MME 230 providing information of the UE's CSG membership to the home eNodeB 220 during the establishment of a connection (S1 establishment) with a UE 210. This information can then be transferred from a source eNodeB to a target eNodeB during signaling exchange that occurs during the handover process (context transfer) moving the UE 210 from the serving to the target Node B.

According to a seventh embodiment of the invention, the CSG cell is aware of the membership type (CSG member, guest member, and possibly even CSG administrator) during call setup. This information is then used by the CSG cell to redirect certain users (e.g. guest members) to a different network layer for any of various reasons, such as service or load reasons. According to this embodiment the CSG cell is made aware of the membership type by a slight change to the connection setup signaling. For example, the UE 210 may include in the RRC:CONNECTION REQUEST message it sends to the home Node B 220 information about its membership (guest member, CSG member or even CSG administrator). The guest member status is only needed when the UE accesses a CSG cell having its access mode indicator set to 'open access'.

Figure 3:
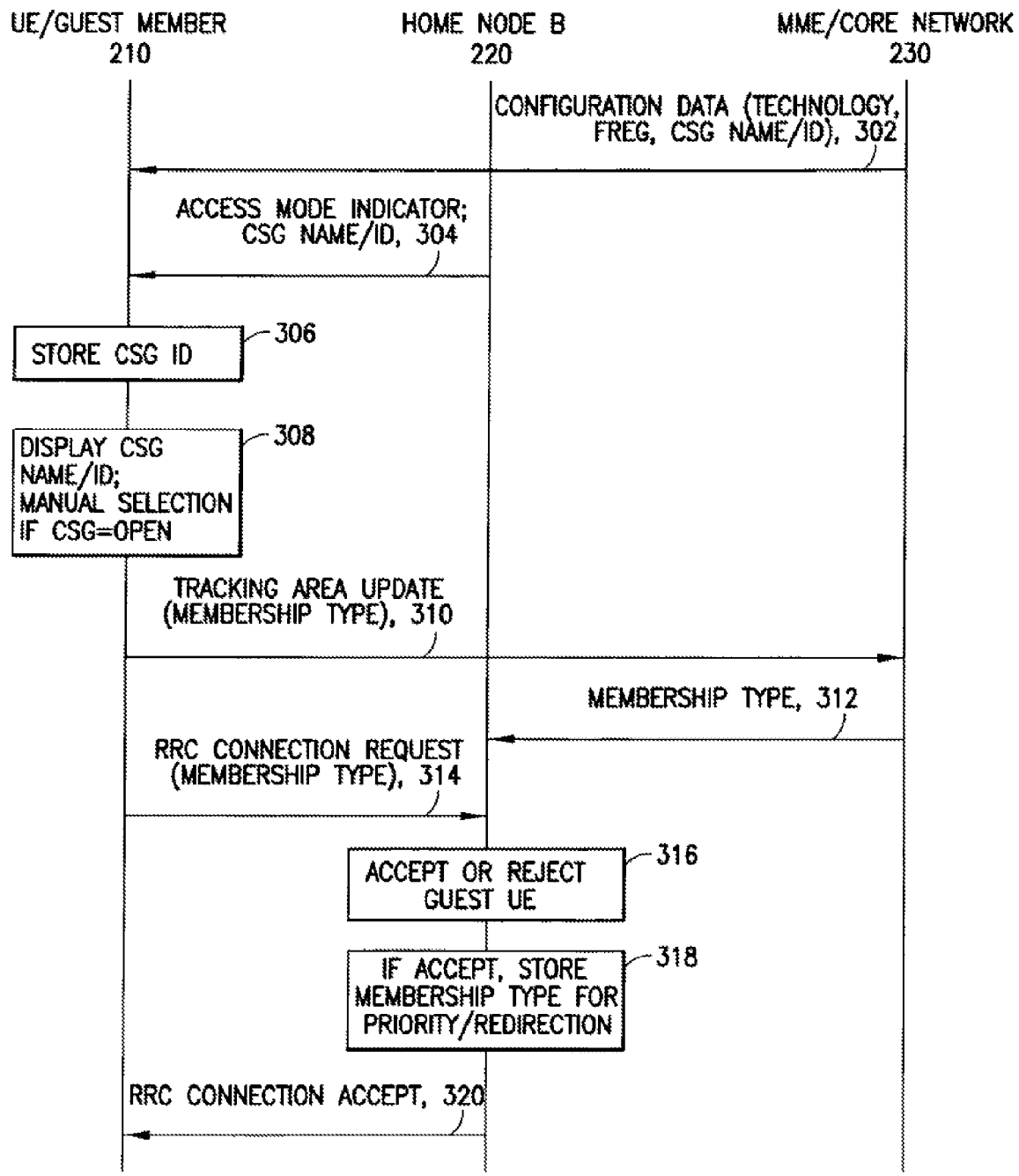
FIG. 3 is an exemplary signaling diagram showing implementations of certain ones of the various embodiments of the invention detailed below.

Signaling for the various ones of the above aspects is shown at FIG. 3, a signaling diagram between the UE 210 as guest member, the home Node B 220, and also the higher network node MME 230. All of the above aspects are shown in FIG. 3, though it is understood that embodiments of the invention need not encompass all of these aspects or all of the signaling shown by example at FIG. 3. According to the third aspect above the core network 230 send configuration data 302 to the UE/guest member, giving it information such as technology, frequency carriers, and/or CSG name ID for use in searching for CSGs that may be open and which the UE 210 is not a regular member. This may be done during tracking area update signaling. The core network is able to differentiate between a CSG user and guest member and apply different charging plans if desired.

According to the first aspect above the home Node B 220 (the designation Home node B indicates a node B of a CSG network) sends an access mode indicator 304, for example with system information over a broadcast channel. According to the fourth aspect the home node B 220 may also send its CGS name and/or identifier in that same system information.

According to the fifth aspect above, the UE 210 stores 306 the CSG ID that it received from the core network 230 (at 302) or the home node B (at 304) for smooth movement throughout the CGS network, if and when the UE 210 accesses that network. According to the second aspect of the invention noted above, the UE displays on its display interface 210F the CSG name, and if the user voluntarily chooses to attempt entry into the CSG network for which it is not a regular member and whose access mode indicator indicates open, the user manually selects to access that network. The UE 210 then searches, such as using the information from the configuration data 302, for the CSG network and its 'open' indicator.

According to the sixth aspect above the UE 210 sends its membership type to the core network. The UE 210 knows which (if any) CSGs in which it is a regular member, and knowing (from 302 or 304) that the CSG ID of the home Node B 220 enables it to send 310 its membership type (regular member, guest member, administrator) to the core network 230, such as during a tracking area update. Note that the tracking area updates occur routinely, so one tracking area update signaling 302 may provide the CSG network name/ID to the UE 210 and another might provide the UE's membership type 310 to the core network 230. Then the core network signals 312 the membership type to the home Node B 230. Alternatively, the UE 210 can provide its membership type to the home Node B 220 directly such as within a RRC CONNECTION REQUEST message 314, according to the seventh aspect noted above. In any case, the home Node B220 decides to accept or reject the guest UE 210 at block 316, such as for example whether it has capacity for another connection. If the home Node B 220 accepts the guest member UE 210, then at block 318 it stores in its local memory 220B the membership type of that guest UE 210 for later use in prioritizing services or redirecting to other network layers as noted for the sixth aspect of the invention.

Finally, the home Node B sends a RRC CONNECTION ACCEPT message (RRC CONNECT message) 320 to the UE 210, thereby establishing a bidirectional link 240 with the UE 210 within the CSG network of which the UE is not a regular member.

Highlights of some of the above aspects are presented in the following example. The CSC manager sets the CSG network to "open" mode, which is broadcast so that the UEs, even those not members of the CSG user group, are aware of the access type. The prospective guest member is not automatically granted access to the network; the guest member needs to force its UE apparatus (e.g., mobile terminal or station) to camp on the CSG network (e.g., via a display of the CSG name on the display interface and manual selection of same by the user). When the guest member registers to the core network, such as via a tracking area update which it needs to update its registration, the operator of the CSG network can accept or reject the registration based on subscription reasons, which the CSG network operator knows from the membership type the UE provides either directly or via the core network. If access is granted and registration is successful, the guest member can access the CSG network with the limitations provided by the CSG operator/administrator, which may include limited uplink/downlink resources, receipt of advertising messages, lower priority in congestion environments, etc. The guest member than returns to the macro network (the regular cellular/non-CSG network) manually when the user leaves the CSG's network coverage area.

Consider the following specific example. A café decides to provide inexpensive calls to its customers on its premises. The cafe may notify their customers with information needed to access its own network (e.g. carrier frequency). A customer enters and voluntarily accesses the café's CSC network. Once the customer accesses the network as a quest member, he/she is able to use the CSG network with the limitations provided in operator CSG administrator (e.g. VoIP+default bearer only supported).

Consider another example. A university campus agrees with a (non-restricted) network operator to implement a university network where students can access the university intranet and make voice calls at low/no additional cost, saving the university from having to provide computer laboratories with an overcapacity for that purpose. As part of this agreement, the university campus is allowed to open its CSG network to public users. Revenues obtained from the public users may then be split between the non-CSG operator and the university that operates the CSG.

Certain concerns come to light. There may be an uncontrolled number of users accessing the network that may derivate to call blocking, charging issue, and CSG cell capacity. Charging issues are to be worked out between the CSG operator and the macro-network operator granting the CSG resources, such as the revenue split noted above. To enable open CSG cells for a home based CSG cell (e.g., home NodeBs are understood in the early development of LTE as being actual home-based rather than business based as expanded herein to include), capacity of those domicile-type CSG cells should not be restricted to only a few users per call, which would be an average number of family members and is the current understanding in LTE. The capacity expected from corporate CSG cells should be sufficient to deal with guest members.

Clearly a simple implementation of certain of the above aspects of the invention will be streamlined if they were adopted into LTE or other wireless protocol as network and UE procedures. Further, those protocols might also stipulate mobility procedures for the network and UE for CSG regular members and guest members, where the guest members may be manually selecting to join and to leave a CSG network for which they are not a member of the user group. Also where appropriate, the non-access stratum signaling noted above would need to be stipulated in the protocol. Access control might include, as above, broadcasting access type information in the air interface (e.g. 0=closed access where only CSG members are allowed to access the network; 1=open wherein guest members are also allowed access). The identification (name) of the CSG network is needed for access, since the guest member will need this information to know which CSG network to join if there are more than one in the vicinity. As to mobility aspects, a manual input is needed for a manual CSG network search (carrier frequency etc) as noted above.

Now is described an eighth aspect of the invention, a business model in which the CSG administrator becomes a content provider (develops and maintains its own content) by using the operator's network platform, and broadcasts information to all or part of the users camped on the CSG administrator's network. For example, the CSG administrator can provide advertisements to all users under its own CSG network. This is linked to the above aspects of opening the CSG network to guest members in that it provides a potential revenue stream for the CSG network operator to set its access mode indicator to "open" whereby the advertisements it sends to the guest members are over and above those it could otherwise send if its network were 'closed' and limited only the members of its regular user group.

It is anticipated that at least in LTE, the CSG administrator is to have access to the regular (cellular, non-restricted) network operator's portal, and so the CSG administrator can configure its own CSG network and add new subscribers. This eighth aspect of the invention may be implemented therefore by using the same portal where the CSG administrator is able to use the Multimedia messaging network (a part of the non-restricted network, the operator's) in order to be able to forward messages to all or part of the subscribers that are under the CSG network owned by the CSG administrator.

Figure 4:
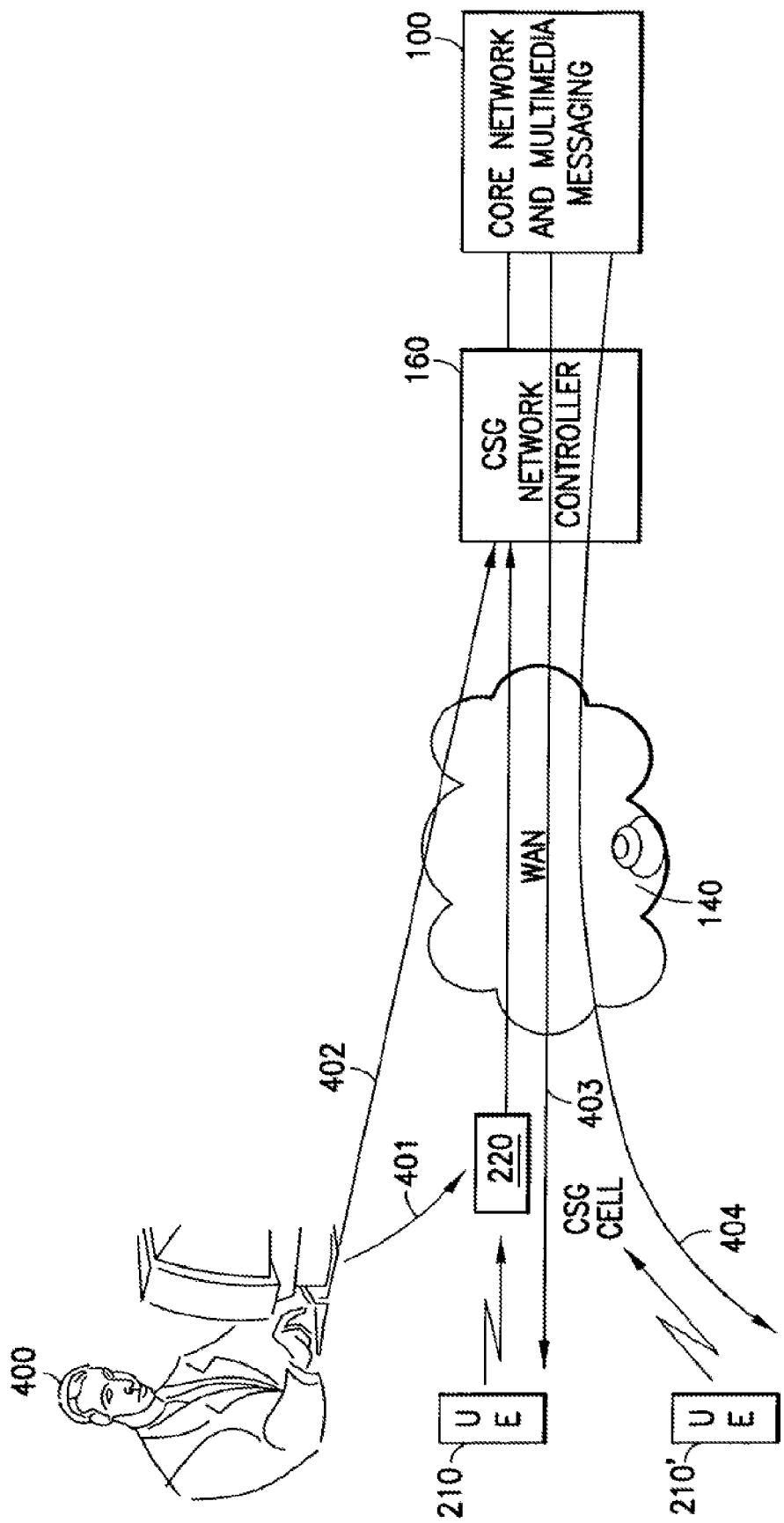
FIG. 4 illustrates a schematic diagram wherein a closed subscription network owner operates as a content provider to its own closed network according to an embodiment of the invention.

An exemplary scenario is shown at FIG. 4. First, the CSG administrator 400 accesses the operator's network 140/160 (e.g., the non-restricted network and a Node B or more typically a higher network node of that non-restricted network) through e.g. a portal. The CSG administrator 400 may connect to the portal through route 401, via the CSG cell (home Node B 220 or other part of the CSG network) or through route 402 (from anywhere else). Restricting the access to the portal via the CSG cell (route 401) is advantageous in terms of security. The portal may be located in the CSG network controller 160 (who handles the CSG cells) or it may be forwarded by the CSG network controller 160 to some other element in the operator's network.

Content is stored at operator's network or at a server or personal computer PC of the CSG owner. The CSG administrator 400 is able to send its content to the Multimedia messaging platform 100 in the core network via the CSG network controller 160 and also configure messaging options. Examples of message option configurations include users that will receive the messaging; type of messaging to be sent; and frequency of the messaging, to name a few. Sending of the multimedia messaging is in principle restricted to the CSG administrator's network, the CSG network itself. Thus the CSG administrator 400 cannot use this platform to send messages to other CSG networks or to the public (non-CSG) network. This restriction can be eliminated if the non-CSG operator grants this permission, since the non-CGS operator has control over its own network. Messages are sent from the Multimedia messaging platform 100 to the users/UEs 210, 210' in the CSG network as shown by the downlink direction arrows 403, 404. Thus, this aspect of the invention proposes a model in which the CSG owners are at the same time content providers to their own networks, thereby providing the opportunity for an enhanced revenue stream for the CSG owners/administrators.

Note however that this eighth aspect is not dependent upon the CSG network being potentially open to guest members; the business advantages are greater in that environment but are not a condition precedent to this eighth aspect. Where the CSG network is opened to guest members, the network operators and the CSG owners can agree on allowing Guest members to access the owned CSG networks, making it possible for a café for example to provide free or cheap calls to all their customers entering to its premises, registered member or not. It also allows the CSG owners to open their CSG network and to charge to the guest members for their corresponding calls (including voice and/or data) generated in their networks. Similarly, a university campus or a corporation operating a CSG may find an opportunity to charge visitors for access via per call or per byte charges for example. Certain events such as festivals or exhibitions may provide facilities to the public and perhaps generate their own advertisements, and where there is a pre-existing CSG network in the area of the festival or event the CSG owner can set its access mode indicator to 'open' only for the duration of the event if it has no need for more frequent occurrences of opening its CSG to guest members. Further, communities like that proposed by Vodafone® (e.g., FON communities, see Appendix C of the priority document for pages printed from www.fon.com/en) can be created, aiding in leveraging the use of LTE home cells throughout the world.

As can be seen, adding "guest members" to the user groups in the manner known in the prior art for the examples above would be quite difficult; the CSG manager/administrator would need to register each user one at a time into the CSG network using its IMSI/MEI or other such unique identifier added to the user group database. Embodiments of this invention enable the CSC to be operated selectively as open or closed, rather than the prior art approach of operating a CSG network always and only as closed with no option for open. The guest member concept enables new business models between the non-registered network operators (under whose license and responsibility the CSG operators operate) and the CSG operators/owners (e.g., corporations, institutions, universities, home users, etc.).

This eighth aspect of the invention therefore extends the concept of providing simple radio coverage to the operator's network, the operator may offer hosting capabilities to the CSG administrators so that CSC managers may create their own advertisement and their own content in general. Their motivation to do so is the increased potential audience due to the guest member concept. In the café example above where the café operates the CSG network/cell, the cafe may offer its customers access to its own intranet where there are different menu options. In addition, the cafe can advertise new products via MMS, SMS etc as an offset to its low/no cost call promotion.

Clearly the above business examples only touch on the possibilities the guest member concept enables. The concept of guest member access to a CSG network enables a world of opportunities for new business models between the operator and the CSC owners. Such a broad customer base on a CSG network is not seen as practical, or with current access control assumptions even possible, using the traditional one-by-one registration of users into the regular user group. It is a critical feature as basic business models such as Cafes offering access to their customers will not be possible in practice. The eighth aspect above not only extends coverage of the CSG network to more potential users, but enables the CSG operators to become their own content providers for advertisements or menu options or the like within their CSG cells, and for a greater number of prospective buyers.

For the aspects of this invention related to the home Node B/CSG operator/administrator, embodiments of this invention may be implemented by computer software executable by a data processor of the Node B 220, such as the processor 220A shown, or by hardware, or by a combination of software and hardware. For the aspects of this invention related to UE 210, embodiments of this invention may be implemented by computer software executable by a data processor of the UE 210, such as the processor 210A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

According to an embodiment of the invention then, from the perspective of the Node B for example, is a method, a memory storing a computer program executable by a processor, and an apparatus that operates to send an access mode indicator that indicates whether the closed subscriber network is being operated as open or closed, and for the case that the access mode indicator indicates that the network is being operated as open, to establish a bidirectional link with a user device that is not a member of a user group of the closed network and thereby allow the user device access to the closed subscriber network via the bidirectional link. Further implementation details and variations are shown by example at FIG. 3 and in text above, wherein FIG. 3 illustrates certain method steps for the node B.

According to another embodiment of the invention, from the perspective of the Node B for example, is a method, a memory storing a computer program executable by a processor, and an apparatus that operates to operate a closed subscriber group cell, to store content on a platform of a non-restricted network, to configure messaging options, and to send messages that include at least some of the content to users of the closed subscriber group cell according to the messaging options.

According to another embodiment of the invention, from the perspective of the UE for example, is a method, a memory storing a computer program executable by a processor, and an apparatus that operates to receive, from a closed subscriber network of which the apparatus is riot previously a registered member of its user group, an access mode indicator that indicates whether a closed subscriber network is being operated as open or closed, and for the case that the access mode indicator indicates that the network is being operated as open, to establish a bidirectional link with the closed subscriber group network and thereby gain access to the closed subscriber network via the bidirectional link. Further implementation details and variations are shown by example at FIG. 3 and in text above, wherein FIG. 3 illustrates certain method steps for the UE.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate. Such integrated circuits/modules have functional circuits that operate to perform the signaling and method steps shown by example at FIG. 3.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor has been completed, the resultant design, in a standardized electronic format (e.g.,. Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

What is claimed is:

1. A method comprising:
    receiving, at a user equipment from a closed subscriber group network, an access mode indicator that indicates whether the closed subscriber group network is being operated as open or closed;
    sending, in a message from the user equipment to the closed subscriber group network, an indication of membership status of the user equipment; and
    establishing a bidirectional link between the user equipment and the closed subscriber group network, thereby the user equipment accessing the closed subscriber group network as a guest member, the establishing of the bidirectional link being for a case where the access mode indicator indicates that the closed subscriber group network is being operated as open and based at least in part on the indication of the membership status indicating that the user equipment is not a registered member of the closed subscriber group network.

2. The method of claim 1, wherein the sending of the indication of the membership status of the user equipment occurs during a tracking area update.

3. The method of claim 1, wherein the access mode indicator is received over a broadcast channel.

4. The method of claim 1, wherein the access mode indicator is received as a result of a search by the user equipment for networks having respective access mode indicators set to open, the search being performed using network configuration parameters that are stored in a local memory prior to the search.

5. The method of claim 4, further comprising:
receiving one of a name and an identifier for each of the networks that are searched;
displaying at a display interface of the user equipment the name or identifier for each of the networks having the respective access mode indicators set to open;
receiving a manual selection of the displayed name or identifier; and
establishing the bidirectional link between the user equipment and the close subscriber group network with a network for which the manual selection is received.

6. The method of claim 1, further comprising:
receiving an identifier of the close subscriber group network that is accessed;
storing the received identifier in a local memory of the user equipment; and
using the stored identifier to facilitate handover between cells within the closed subscriber group network.

7. The method of claim 6, wherein the identifier is received via non-access stratum signaling.

8. The method of claim 1, further comprising:
sending to the closed subscriber group network an indication that the user equipment is accessing as a guest member.

9. The method of claim 1, wherein the message from the user equipment is a radio resource control message, the radio resource control message being part of a handover process to handover the user equipment to a cell within the closed subscriber group network.

10. A computer readable memory embodying a program of instructions that when executed by a processor cause actions directed to accessing a closed subscriber group network as a guest member, the actions comprising:
receiving, at a user equipment from a close subscriber group network, an access mode indicator that indicates whether the close subscriber group network is being operated as open or close;
sending, in a message from the user equipment to the close subscriber group network, an indication of a membership status of the user equipment; and
establishing a bidirectional link between the user equipment and the closed subscriber group network, thereby the user equipment accessing the closed subscriber group network as a guest member, the establishing of the bidirectional link being for a case where the access mode indicator indicates that the close subscriber group network is being operated as open and based at least in part on the received indication of the membership status indicating that the user equipment is not a registered member of the close subscriber group network.

11. A user equipment comprising:
a receiver configured to receive, at the user equipment from a close subscriber group network, an access mode indicator that indicates whether the close subscriber group network is being operated as open or close;
a transmitter configured to send, in a message from the user equipment to the close subscriber group network, an indication of a membership status of the user equipment; and
a processor configured to establish a bidirectional link between the user equipment and the closed subscriber group network, thereby the user equipment accessing the closed subscriber group network as a guest member, the establishment of the bidirectional link being for a case where the access mode indicator indicates that the closed subscriber group network is being operated as open and based at least in part on the indication of the membership status indicating that the user equipment is not a registered member of the close subscriber group network.

12. The user equipment of claim 11, wherein the indication of the membership status of the user equipment being sent occurs during a tracking area update.

13. The user equipment of claim 11, wherein the receiver is further configured to receive the access mode indicator over a broadcast channel.

14. The user equipment of claim 11, wherein the receiver is further configured to search for networks having respective access mode indicators set to open using network configuration parameters that are stored in a memory of the user equipment prior to the search.

15. The user equipment of claim 14, wherein the receiver is further configured to receive one of a name and an identifier for each of the networks that are searched;
the user equipment further comprising a user interface configured to:
display the name or identifier for each of the networks having the respective access mode indicators set to open; and
receive a manual selection of the name or identifier displayed; and
the processor further configured to establish a bidirectional link between the user equipment and the close subscriber group network with a network for which the manual selection is received.

16. The user equipment of claim 11, wherein the receiver is further configured to receive an identifier of the close subscriber group network that is accessed as a guest member;
the user equipment further comprising memory configured to store the identifier that is received; and
the processor further configured to use the identifier that is stored to facilitate handover of the user equipment between cells within the close subscriber group network.

17. The user equipment of claim 16, wherein the identifier is received via non-access stratum signaling.

18. The user equipment of claim 11, wherein the transmitter is further configured to send to the closed subscriber group network an indication that the user equipment is accessing as a guest member.

19. The user equipment of claim 11, wherein the message from the user equipment is a radio resource control message, the radio resource control message being part of a handover process to handover the user equipment to a cell within the closed subscriber group network.

* * * * *

UNITED STATES PATENT AND TRADEMARK OFFICE
CERTIFICATE OF CORRECTION

PATENT NO. : 9,220,014 B2  
APPLICATION NO. : 14/325124  
DATED : December 22, 2015  
INVENTOR(S) : Ivan Ore et al.

Page 1 of 1

It is certified that error appears in the above-identified patent and that said Letters Patent is hereby corrected as shown below:

Title Page 1, Item 57 ABSTRACT:
Column 2, line 29, change "close" to --closed--;
Column 2, line 30, change "close" to --closed--;
Column 2, line 32, change "close" to --closed--;

Title Page 2, Item 56 References Cited:
Column 2, line 26, change "(E_UTRAN):" to --(E_UTRAN);--;
Column 2, line 26, change "description:" to --description;--;

In the Claims

Column 15:
Line 18, Claim 5, change "close" to --closed--;
Line 21, Claim 6, change "close" to --closed--;
Line 42, Claim 10, change "close" to --closed--;
Line 44, Claim 10, change "close" to --closed--;
Line 45, Claim 10, change "close" to --closed--;
Line 46, Claim 10, change "close" to --closed--;
Line 54, Claim 10, change "close" to --closed--;
Line 58, Claim 10, change "close" to --closed--;
Line 61, Claim 11, change "close" to --closed--;
Line 62, Claim 11, change "close" to --closed--;
Line 63, Claim 11, change "close" to --closed--;

Column 16:
Line 2, Claim 11, change "close" to --closed--;
Line 14, Claim 11, change "close" to --closed--;
Line 38, Claim 15, change "close" to --closed--;
Line 42, Claim 16, change "close" to --closed--; and
Line 48, Claim 16, change "close" to --closed--.

Signed and Sealed this  
Twenty-eighth Day of June, 2016

Michelle K. Lee  
*Director of the United States Patent and Trademark Office*